UNITED STATES PATENT OFFICE 2,370,185

PREPARATION OF NITROLIC ACIDS AND PSEUDONITROLES

Edwin M. Nygaard, John H. McCracken, and Thomas T. Noland, Woodbury, N. J., assignors to Socony-Vacuum Oil Company, Incorporated, a corporation of New York No Drawing. Application May 29, 1943, Serial No. 489,066

4 Claims. (Cl. 260—500)

This invention has to do with a new method for the preparation of nitrolic acids and pseudonitroles.

It has long been known in the chemical art that nitrolic acids and pseudonitroles are prepared by reaction of nitrous acid with primary and secondary nitroparaffins, respectively. For example, a nitrolic acid, such as propyl nitrolic acid, is obtained from primary nitropropane (1-nitropropane), as illustrated by Equation I:

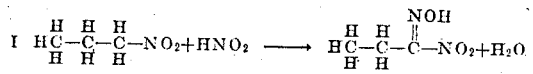

Similarly, a pseudonitrole, such as propyl pseudonitrole, is obtained from secondary nitropropane (2-nitropropane), as illustrated by Equation II:

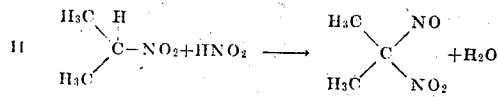

These reactions are usually carried out by dissolving a nitroparaffin in aqueous alkali, then adding an inorganic nitrite and acidifying in the cold with a mineral acid. Another suggested procedure involves the steps of dispersing a nitroparaffin in water, saturating the resultant dispersion with nitrous acid, making the solution strongly alkaline with an alkali metal hydroxide and then acidifying with a mineral acid.

It should be clear from the foregoing that all of the methods known to the art for the preparation of nitrolic acids and pseudonitroles are dependent upon the use of nitrous acid, either per se, or developed in the preparation from an alkali nitrite and a mineral acid. We have, however, now discovered a new method for the preparation of the aforesaid nitrogen-containing compounds wherein it is unnecessary to use nitrous acid or its equivalent in the form of a nitrite.

Accordingly, the present invention is predicated upon the discovery of a novel method for the preparation of nitrolic acids and pseudonitroles. This new method is extremely simple and merely involves contacting a nitroparaffin with aqueous alkali at a suitable temperature, thereafter acidifying the nitroparaffin-alkali mixture at a temperature below about 15° C. with a mineral acid other than nitrous acid, and then separating a nitrolic acid or pseudonitrole from the reaction mixture. While this method is characterized by the distinct advantage over prior methods that nitrous acid is not required as a reactant, it is further advantageously characterized by the fact that certain valuable by-products, such as oximes, aldehydes and ketones, are obtained therewith. For example, acetoxime is obtained as a by-product in the preparation of propyl pseudonitrole from 2-nitropropane.

Certain precautions should be observed in order to achieve a high degree of efficiency with the present method. For example, it is desirable to use a stoichiometrical quantity, or a slight excess, of a relatively strong alkali with the nitroparaffin reactant; however, a large excess of alkali is not conducive to the obtainment of good yields of the desired nitrolic acid or pseudonitrole. In this connection, when a 100 per cent excess of 30 per cent sodium hydroxide solution was used with 2-nitropropane, the yield of propyl pseudonitrole was very small. While various strengths of alkali, as alkali metal hydroxides and alkaline earth hydroxides, may be used effectively in the present method, preferred for use are aqueous alkalis having concentrations from about 10 per cent to about 30 per cent. Relatively weak alkalis, such as ammonium hydroxide and organic amines, are not contemplated for use in this method, for they are apparently too weakly basic to produce the salts of the nitroparaffins necessary for the reaction. Accordingly, as used herein, the language "relatively strong alkali" refers to an alkali metal hydroxide or an alkaline earth metal hydroxide, and thus refers to an alkali suitable for use in the present method. Although a nitroparaffin may be contacted with an alkali at high or low temperatures, temperatures of the order of 20–25° C. are suitable for this purpose. Care should be taken in the acidification treatment so that the temperature throughout this operation be maintained below about 15° C. In general, temperatures from about 0 to about 5° C. are preferred for the acidification operation. It has been found that if the temperature of the reaction mixture is allowed to increase above about 20° C. during and after the acidification, increasing amounts of nitrous oxide ($N_2O$) are produced and less nitrolic acid or pseudonitrole is found in the reaction product. For the acidification operation, any mineral acid other than nitrous acid, such as hydrochloric, nitric or sulfuric acid, may be used, and the strength of such acids may be varied considerably. It is preferred, however, that the mineral acid have such a concentration that no appreciable heat is evolved when the acid is diluted with or added to water. The quantity of acid used may be varied over a relatively wide range, but it is desirable to use just a slight excess of acid in the acidification operation. Also, although the nitroparaffin-alkali hydroxide reaction mixture may be added to the mineral acid, or vice versa, in some cases larger yields have been obtained by adding the nitroparaffin-alkali reaction product to the acid. The preferred procedure, however, is that of adding the reactants—acid and nitroparaffin-alkali hydroxide reaction mixture—simultaneously to cold water, at about 0° C. so that at no time is there an excess of acid or alkali in the reaction mixture. During the acidification operation, it is advantageous to keep oxygen out of the reaction mixture. In this regard, it was found that the yields of pseudonitrole and ketone were appreciably reduced, and the amount of nitroparaffin recovered was correspondingly increased, when oxygen was present in the reaction mixture.

At this time, the reaction mechanism involved in the present method is not completely understood. By way of speculation, however, and not by way of limitation, it is most probable that the reaction proceeds in the manner hereinafter described. When a primary nitroparaffin, as 1-nitropropane, is used as the starting material, the reaction may well be represented by Equation III below:

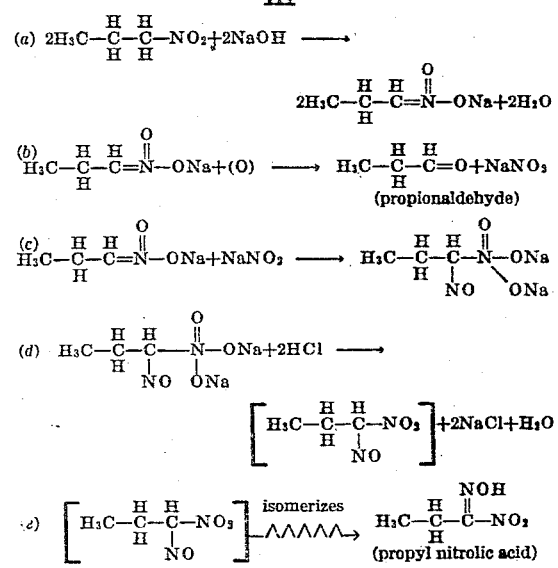

On the same basis, when a secondary nitroparaffin such as 2-nitropropane is used, a pseudonitrole, such as propyl pseudonitrole, and a ketone are produced, as illustrated by Equation IV:

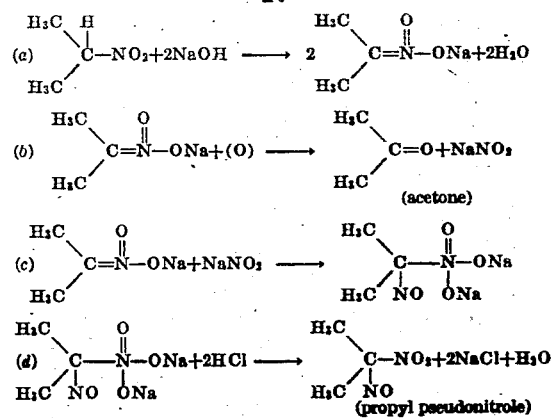

In the speculative Equations III and IV, oxygen is shown in III(b) and IV(b) as entering into the reaction. It is most probable that this oxygen, which appears to be necessary to form the aldehyde or ketone and the sodium nitrite, is furnished by an autoxidation and reduction reaction involving the nitroparaffin or, more probably, its sodium salt. This is borne out to some degree by the presence of small quantities of ammonia and oximes in the reaction products; these substances are known to be reduction products of nitroparaffins. Additional foundation for this assumption is evidence furnished by an experiment in which atmospheric oxygen was entirely eliminated during the entire experiment.

The method contemplated herein is useful not only for the preparation of unsubstituted nitrolic acids and unsubstituted pseudonitroles, but is useful as well for the preparation of various substituted compounds of these types. For example, halogen-substituted nitrolic acids and pseudonitroles may be prepared from their corresponding halogen-substituted primary and secondary nitroparaffins, respectively. In general, any substituent group such as halogen, keto, amino, hydroxyl, etc. may be present on the nitroparaffin reactant, and thus present in the resulting nitrolic acid or pseudonitrole, so long as the substituent group does not interfere with the formation of the alkali metal salt of the nitroparaffin.

In order to illustrate the present invention, typical pseudonitroles and a typical nitrolic acid were prepared as described in detail in the following examples. Example I is illustrative of the preparation of propyl pseudonitrole, and Examples II—A and II—B are illustrative of the preparation of the same compound in an oxygen atmosphere and a nitrogen atmosphere, respectively. It will be apparent from the summary of the products obtained in Examples II—A and II—B that the exclusion of oxygen is preferable inasmuch as a larger yield of propyl pseudonitrole is obtained thereby. Examples III and IV, respectively, show the preparation of a typical halogen-substituted pseudonitrole, chloroethyl pseudonitrole, and a typical nitrolic acid, propyl nitrolic acid.

EXAMPLE I

*Preparation of propyl pseudonitrole*

Into a three-liter three-necked flask equipped with a stirrer, reflux condenser and a thermometer were placed 290 parts by weight of a 30 per cent aqueous sodium hydroxide solution and 178 parts by weight of 2-nitropropane. After the nitroparaffin had gone into solution with some evolution of heat, the solution was refluxed gently without stirring for 70 minutes. The cool product was a clear, orange-colored, syrupy liquid.

Into another three-liter three-necked flask, cooled with an ice bath and equipped with a stirrer and two separatory funnels, were placed 400 parts of distilled water. To the cold water were added simultaneously from the two separatory funnels over a four-hour period, the cold 2-nitropropane-aqueous sodium hydroxide reaction product and 420 parts of cold (1-1) concentrated HCl—H₂O. The reaction mixture consisted of a green solution containing considerable amounts of brownish-white solid. The product was placed in a cold room overnight to complete the precipitation of the solid. The solid was filtered onto a Buchner funnel, washed three times with distilled water, and dried in a desiccator over calcium chloride.

Weight of dried solid was 77 parts by weight. This product proved to be the dimeric form of propyl pseudonitrole. The yield was 65 per cent of the theoretical. The pure dimer is colorless, melts to a blue liquid, and then decomposes. Upon dissolving it in organic liquids, such as benzene, carbon tetrachloride or acetic acid, a deep blue color is imparted to the solutions. This color change is believed to be the result of the dimer changing to the monomer. The melting point of the product is 75° C.; in the literature, the melting point of propyl pseudonitrole is reported as 75° C. Nitrogen calculated for

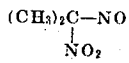

was 23.8 per cent; nitrogen found on analysis was 24.8 per cent.

The aqueous portion of the reaction product was fractionated through a six-plate column. From this fractionation were obtained:

| Parts by weight | Boiling point | Melting point | Yield |
|---|---|---|---|
| | °C. | °C. | Percent |
| 33 (acetone) | 56.5–58 | | 57 |
| 12 (acetoxime) | | 56–58.5 | 8.2 |

The acetoxime was identified by taking a mixed melting with a known sample of acetoxime. There was no depression in melting point.

EXAMPLE II—A

*Preparation of propyl pseudonitrole in an oxygen atmosphere*

Into a two-liter three-necked flask equipped with a thermometer, stirrer and a dropping funnel were placed 840 parts by weight of a ten per cent aqueous sodium hydroxide solution. Into this solution was slowly dropped 178 parts by weight of 2-nitropropane, keeping the temperature between 35° and 40° C., by cooling with a water-bath. The resultant solution was a pale yellow color and was stored at room temperature for three weeks.

Into a three-necked flask, equipped with a stirrer, an inlet tube for oxygen and two dropping funnels, was placed 100 parts of distilled water. The water was cooled by means of an ice bath and to the rapidly-stirred water was introduced a stream of oxygen and simultaneously were added from one separatory funnel one-half of the 2-nitropropane-ten per cent sodium hydroxide reaction product, and from the other separatory funnel 170 parts of (1–1) concentrated HCl—H₂O. These additions required one hour and fifty minutes and oxygen was introduced for another hour. There was a separation of some solid and a viscous blue-colored liquid. The aqueous layer was a deep blue color. The entire reaction product was left in a cold room for four days. The aqueous layer was now yellow and was separated from the heavier blue oil and solid. The addition of petroleum ether to the blue oil precipitated a colorless solid. The solid was filtered off and washed with petroleum ether. It had a melting point of 75° C. and was found to be propyl pseudonitrole. The weight of this solid was 17.6 parts by weight, a yield of 29.8 per cent.

The petroleum ether extract was washed four times with water and the water-washes combined with the aqueous layer of the reaction mixture, and the whole subjected to distillation; acetone, 2-nitropropane and acetoxime were isolated in turn. A considerable additional quantity of 2-nitropropane was recovered by distillation from the water-washed petroleum ether extract. The yields of the various products are summarized in the tabulation given below after Example II—B for comparison with those obtained when nitrogen gas was used.

EXAMPLE II—B

*Preparation of propyl pseudonitrole in a nitrogen atmosphere*

In similar equipment to that used in the above-described experiment, the other half of the 2-nitropropane-ten per cent sodium hydroxide reaction product was treated as in the above experiment, with the exception that a stream of oxygen-free nitrogen was bubbled through the reaction mixture in place of oxygen. There was no need to use petroleum ether to precipitate the propyl pseudonitrole in this experiment, as it separated pure and free from any oil. The yield of recovered products from both experiments are summarized in the following table. Eighty-nine parts by weight of 2-nitropropane were used in each experiment.

| Product recovered | Yield | | | |
|---|---|---|---|---|
| | Oxygen atmosphere | | Nitrogen atmosphere | |
| | Parts by weight | Percent theoretical | Parts by weight | Percent theoretical |
| 2-nitropropane | 37.5 | 42.1 | 9.1 | 10.2 |
| Propyl pseudonitrole | 17.6 | 29.8 | 35.4 | 60.0 |
| Acetone | 10.3 | 35.6 | 17.6 | 60.6 |
| Acetone oxime | 5.5 | 7.5 | 8.6 | 11.8 |

EXAMPLE III

*Preparation of chloroethyl pseudonitrole*

One mol (109.5 g.) of 1-chloro-1-nitroethane was slowly added to 420 grams (1.05 moles NaOH) of 10 per cent sodium hydroxide solution keeping the temperature at 10° C. The resulting solution was a light-yellow color. To this cold solution, surrounded by an ice bath, was slowly added over a period of one-and-a-half hours dilute H₂SO₄ (53.5 parts by wt. conc. H₂SO₄ in 150 cc. of H₂O). The mixture turned a deep blue-green color. The product was a very dark blue oil which separated out on the bottom of the flask. The weight of the product was 62 parts by weight.

This dark blue oil is predominantly chloroethyl pseudonitrole,

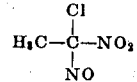

EXAMPLE IV

*Preparation of propyl nitrolic acid*

One mol (89 g.) of 1-nitropropane was dissolved in 420 grams (1.05 mols NaOH) of 10 per cent sodium hydroxide solution. The mixture was permitted to stand at room temperature for a considerable time, and was extracted three times with diethyl ether to remove a small quantity of triethylisoxazole. This ether extract was discarded and the filtered aqueous portion reserved.

In a three-necked flask, equipped with a stirrer and two dropping funnels, was placed a little water. The water was cooled to 5–10° C. and to the stirred solution were simultaneously added over a period of one-and-a-half hours the above filtrate and 268 grams of dilute sulfuric acid (one part of conc. H₂SO₄ to 2.7 parts of H₂O). The reaction mixture was kept at a temperature of 5-10° C. The mixture became a light yellow-green color. A yellow oil was extracted from the reaction mixture with diethyl ether, the ether extract dried with calcium chloride and the ether evaporated. The residue, 25 grams, was a yellow oil; this represents a yield of about 25 per cent. This oil gave a blood-red color with 10 per cent sodium hydroxide solution, characteristic of nitrolic acids.

The aqueous portion of the reaction mixture was partially distilled through a six-plate column. Propionaldehyde was identified in the distillate as a crystalline derivative formed with 5,5-dimethyl-1, 3-cyclohexanedione, melting point 148-150° C. The melting point of the same solid prepared from a known sample of propionaldehyde was 150° C. In this case, a mixed melting point was 149.5° C.

From the foregoing illustrative examples, it will be clear that the present method is a valuable means for preparing nitrolic acids and pseudonitroles. As is well known to those familiar with the art, such compounds are valuable intermediates in chemical synthesis; and, recently, these compounds have been found to be extremely effective ignition improvers in Diesel-type fuels. It will also be apparent from the foregoing examples that the present method provides a means for obtaining appreciable yields of valuable chemicals, such as aldehydes, ketones and oximes.

Although the present invention has been illustrated by the preparation of several specific pseudonitroles and a specific nitrolic acid, it is to be understood that these specific embodiments are but representative of the new method for the preparation of compounds of the broad classes of pseudonitroles and nitrolic acids. Accordingly, the present invention is not to be construed as limited thereto but is to be broadly construed in the light of the defining language in the appended claims.

We claim:

1. The method of preparation of a compound selected from the group consisting of nitrolic acids and pseudonitroles which comprises contacting a nitroparaffin selected from the group consisting of primary and secondary nitroparaffins with substantially a stoichiometrical amount of an aqueous alkali selected from the group consisting of an aqueous alkali metal hydroxide and an aqueous alkaline earth metal hydroxide, then acidifying the nitroparaffin-alkali reaction product so obtained with a mineral acid other than nitrous acid at a temperature below about 15° C. in the substantial absence of oxygen, and separating said compound from the reaction mixture obtained in the preceding operation.

2. The method of preparation of a compound selected from the group consisting of nitrolic acids and pseudonitroles which comprises contacting a nitroparaffin selected from the group consisting of primary and secondary nitroparaffins with substantially a stoichiometrical amount of an aqueous alkali selected from the group consisting of an aqueous alkali metal hydroxide and an aqueous alkaline earth metal hydroxide, then acidifying the nitroparaffin-alkali reaction product so obtained with a mineral acid other than nitrous acid at a temperature below about 15° C. in an atmosphere of nitrogen, and separating said compound from the reaction mixture obtained in the preceding operation.

3. The method of preparation of propyl pseudonitrole which comprises contacting 2-nitropropane with substantially a stoichiometrical amount of aqueous sodium hydroxide, then acidifying the 2-nitropropane-sodium hydroxide reaction product so obtained with a mineral acid other than nitrous acid at a temperature below about 15° C. in the substantial absence of oxygen to form propyl pseudonitrole, and separating said propyl pseudonitrole from the reaction mixture obtained in the preceding operation.

4. The method of preparation of propyl pseudonitrole which comprises contacting 2-nitropropane with substantially a stoichiometrical amount of aqueous sodium hydroxide, then acidifying the 2-nitropropane-sodium hydroxide reaction product so obtained with a mineral acid other than nitrous acid at a temperature below about 15° C. in an atmosphere of nitrogen to form propyl pseudonitrole, and separating said propyl pseudonitrole from the reaction mixture obtained in the preceding operation.

EDWIN M. NYGAARD.
JOHN H. McCRACKEN.
THOMAS T. NOLAND.

Certificate of Correction

Patent No. 2,370,185. February 27, 1945.

EDWIN M. NYGAARD ET AL.

It is hereby certified that error appears in the printed specification of the above numbered patent requiring correction as follows: Page 2, first column, lines 58 to 62 inclusive, for that portion of the formula reading

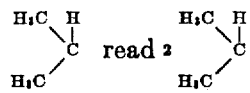

and that the said Letters Patent should be read with this correction therein that the same may conform to the record of the case in the Patent Office.

Signed and sealed this 19th day of June, A. D. 1945.

[SEAL]

LESLIE FRAZER,
*Acting Commissioner of Patents.*